Aug. 19, 1930. K. RASMUSSEN 1,773,118
DRIVE GEAR FOR LOCOMOTIVES
Filed Dec. 15, 1926 8 Sheets-Sheet 1
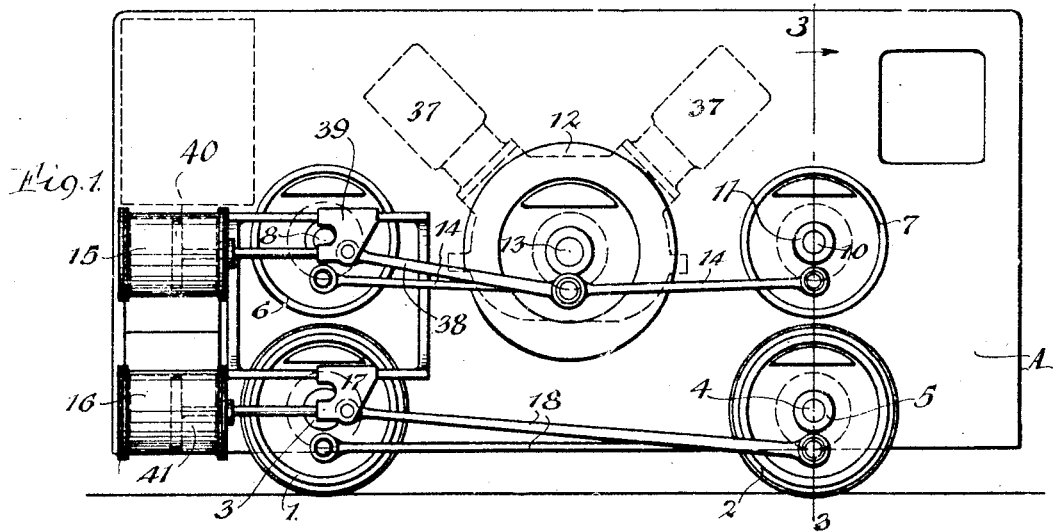
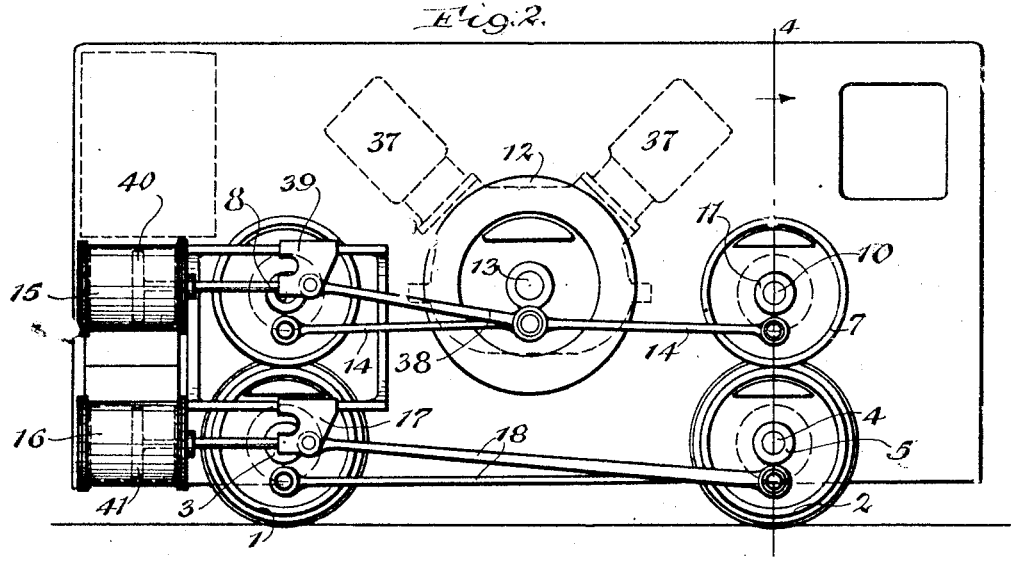
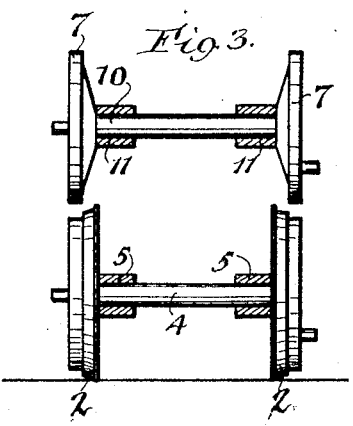
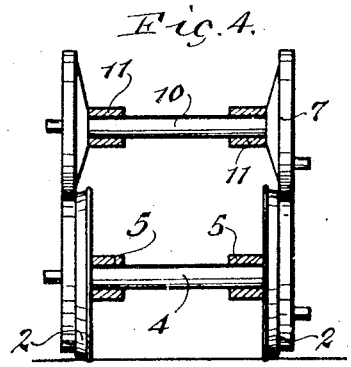
Inventor
KRISTIAN RASMUSSEN
by Popp and Powers
Attorneys Aug. 19, 1930.　　　　K. RASMUSSEN　　　　1,773,118
DRIVE GEAR FOR LOCOMOTIVES
Filed Dec. 15, 1926　　　8 Sheets-Sheet 2
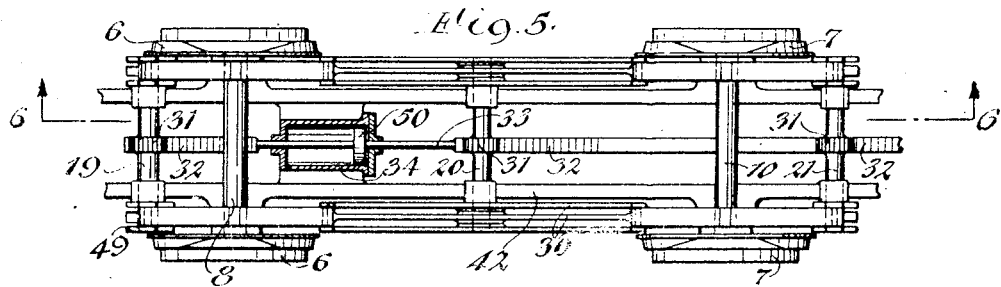
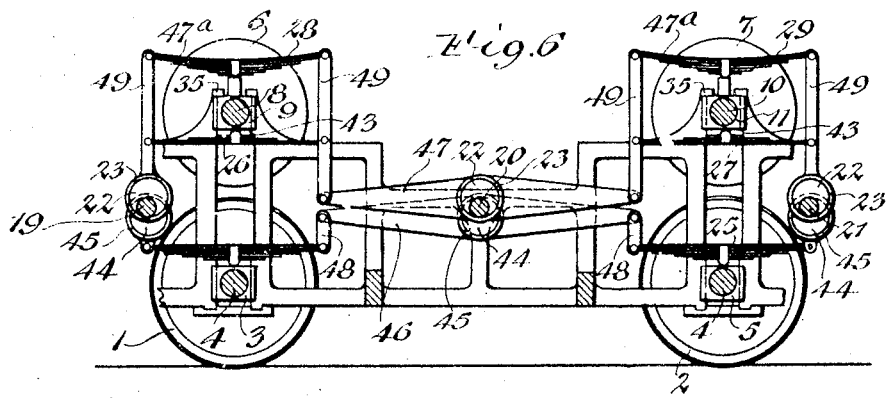
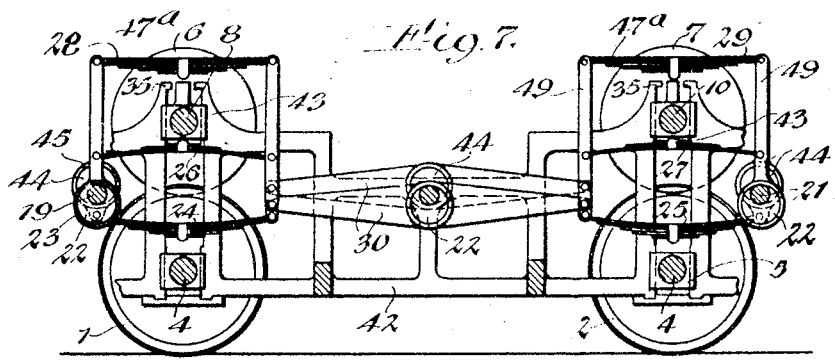
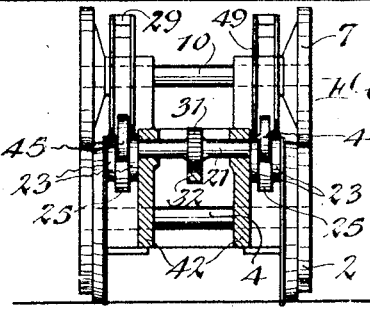
Inventor
KRISTIAN RASMUSSEN
by Popp and Powers
Attorneys Aug. 19, 1930.  K. RASMUSSEN  1,773,118
DRIVE GEAR FOR LOCOMOTIVES
Filed Dec. 15, 1926   8 Sheets-Sheet 3
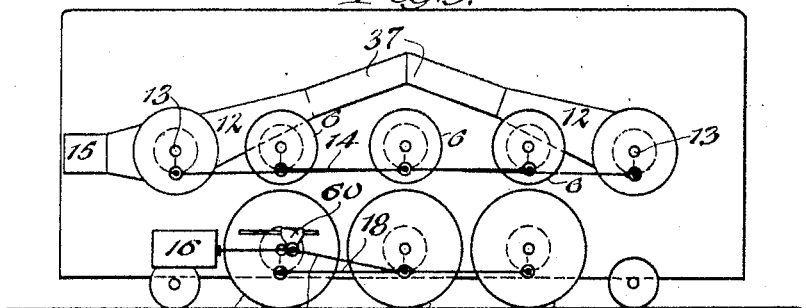
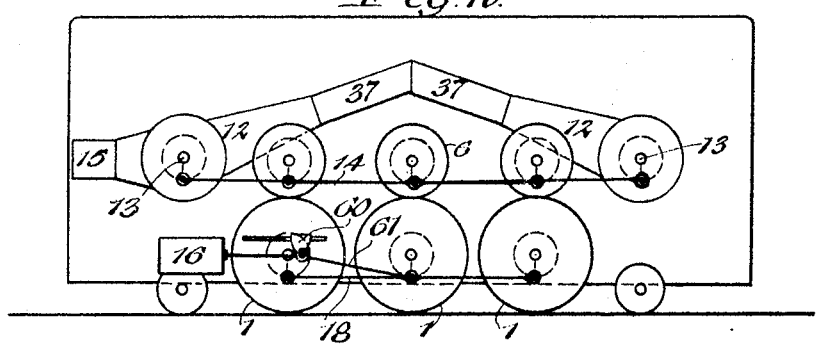
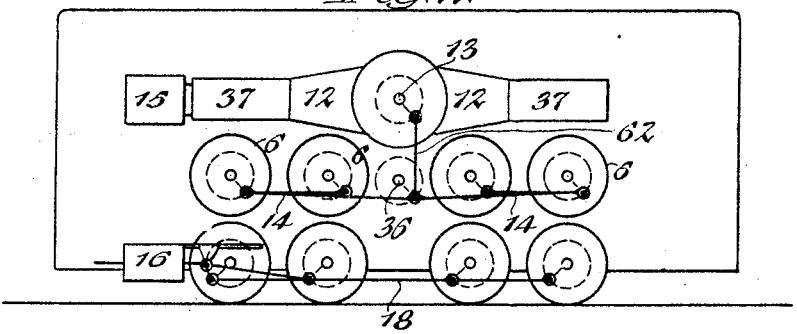
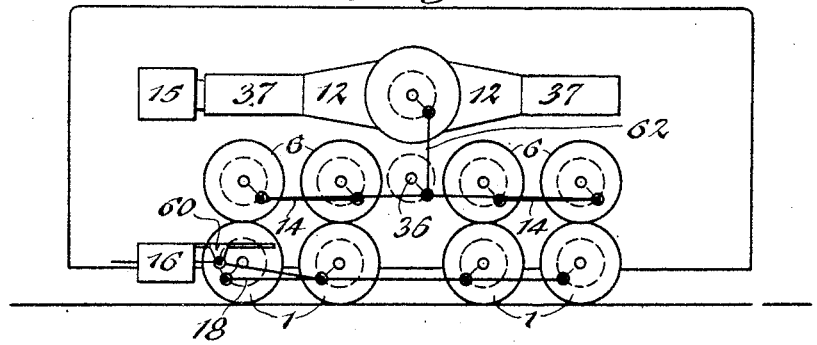
Inventor
KRISTIAN RASMUSSEN
by Popp and Powro
Attorneys

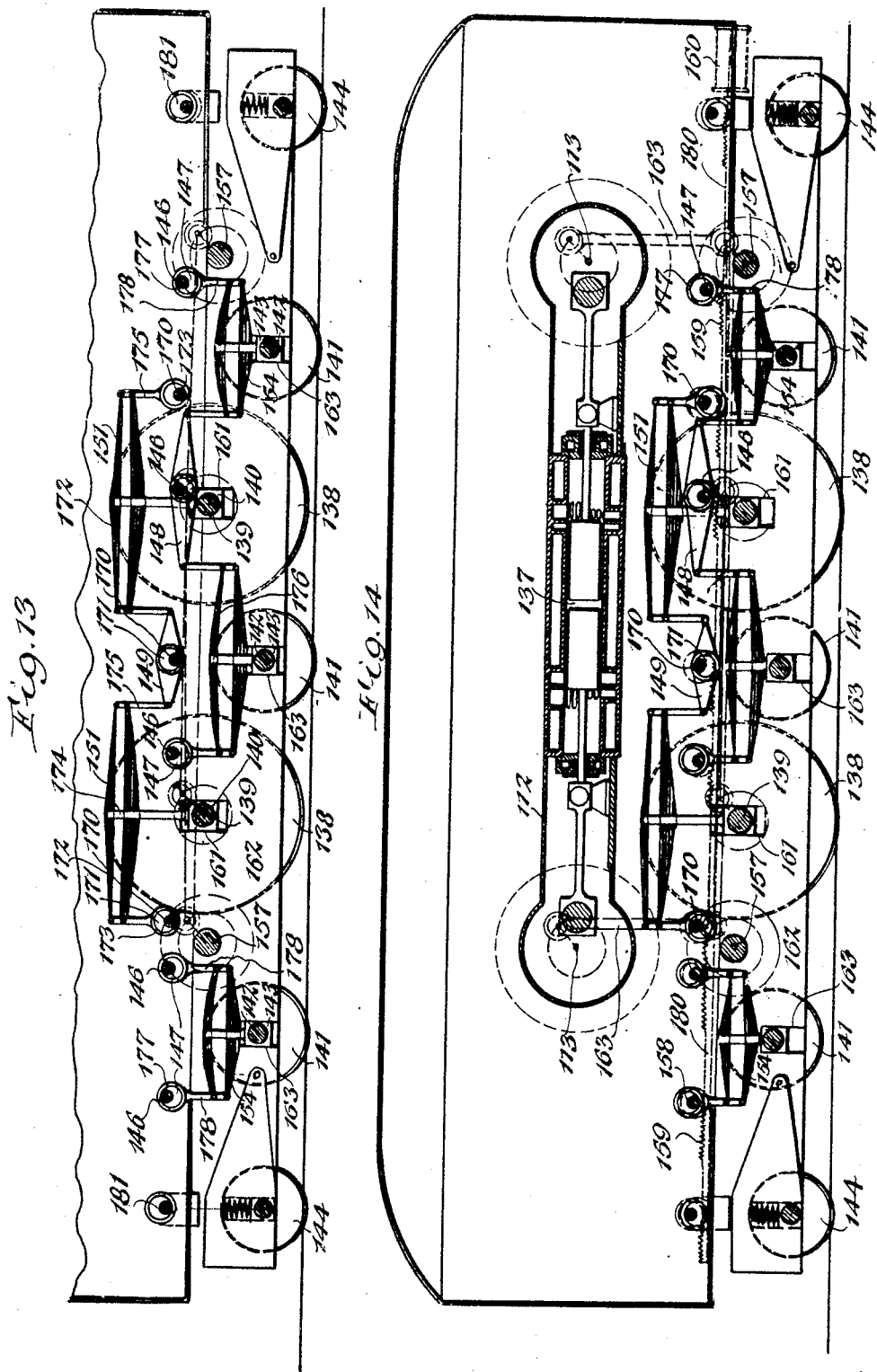

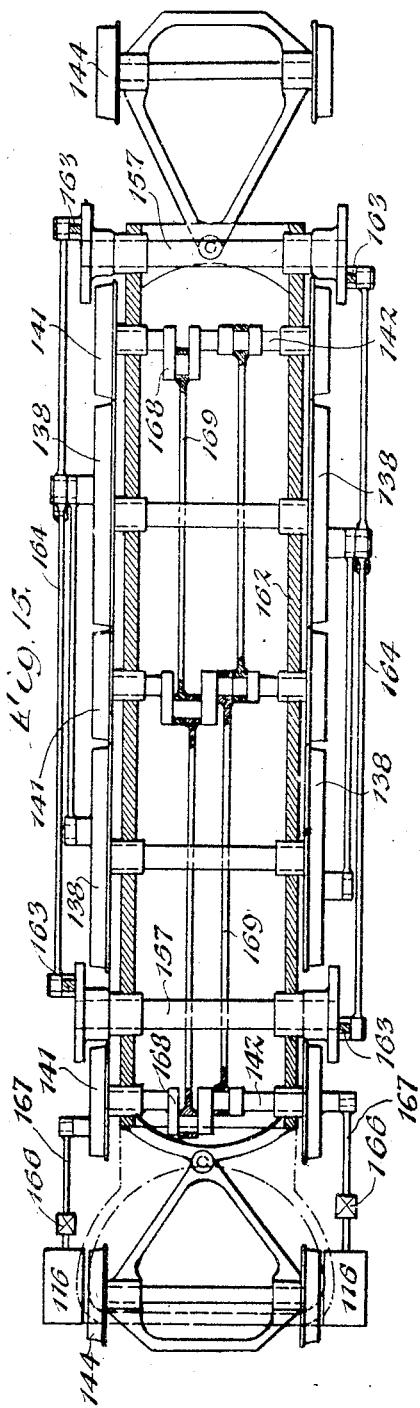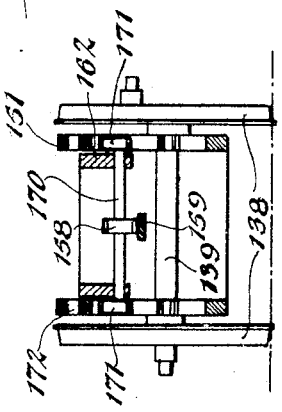

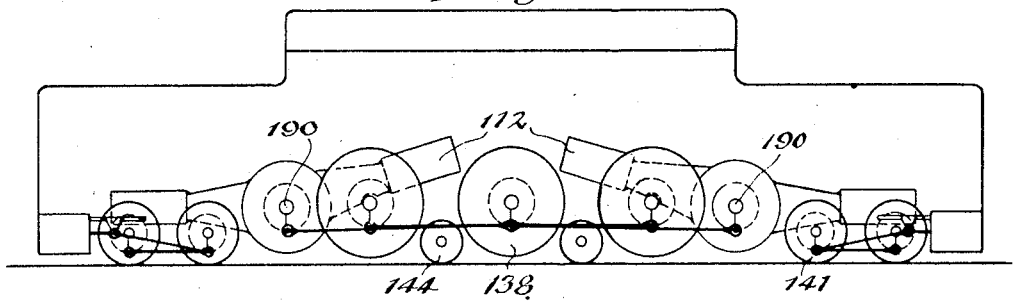
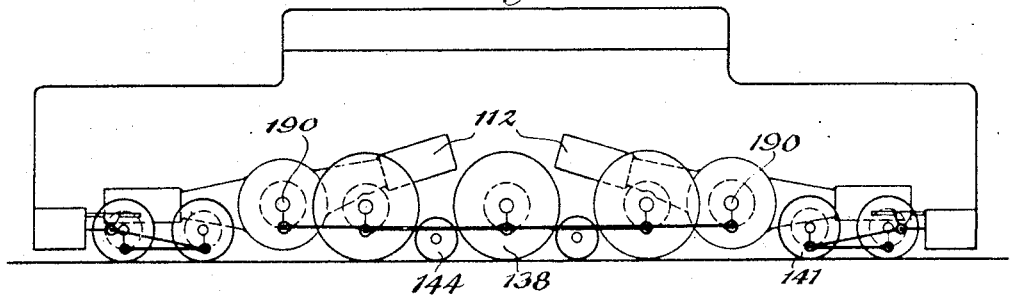
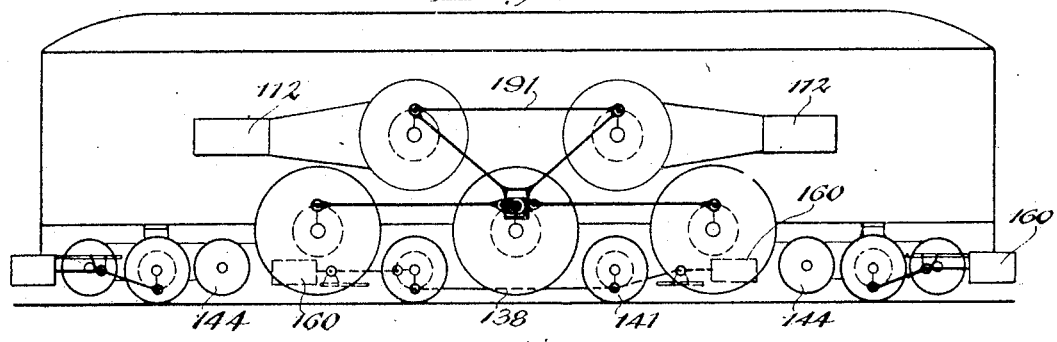
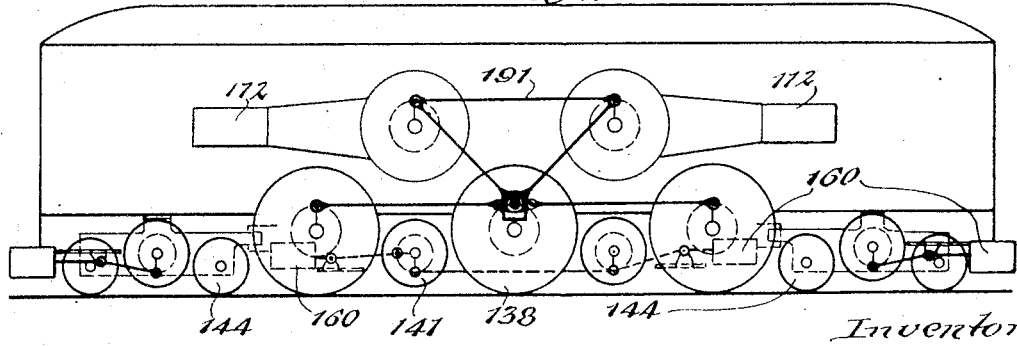

Aug. 19, 1930.  K. RASMUSSEN  1,773,118
DRIVE GEAR FOR LOCOMOTIVES
Filed Dec. 15, 1926    8 Sheets-Sheet 8
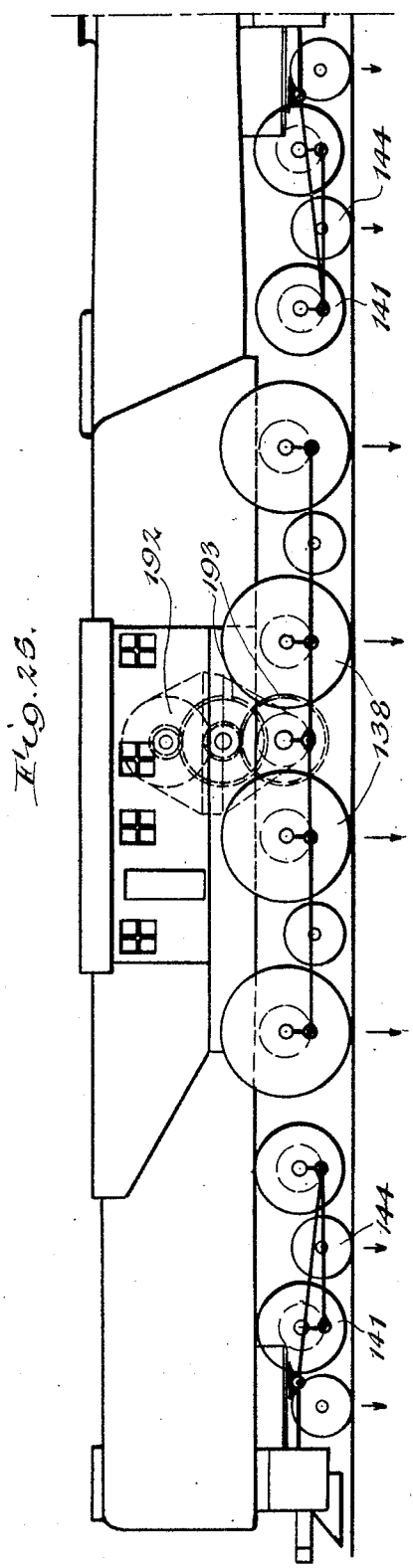
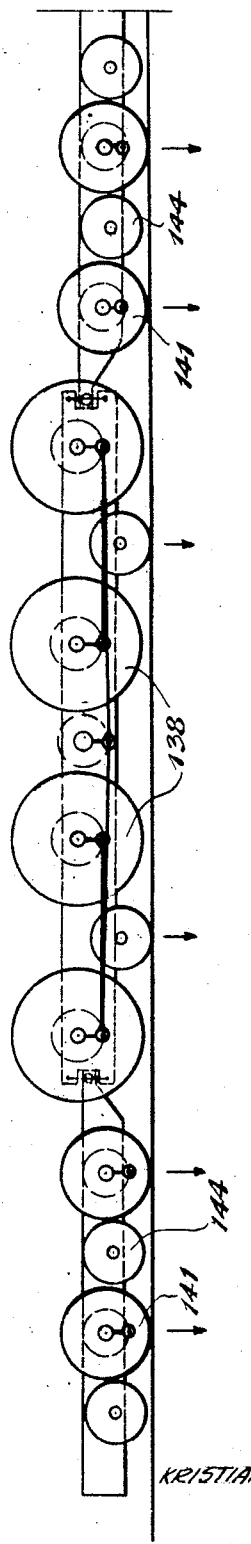
Inventor
KRISTIAN RASMUSSEN
By Popp and Powers
Attorney Patented Aug. 19, 1930

1,773,118

UNITED STATES PATENT OFFICE

KRISTIAN RASMUSSEN, OF BUFFALO, NEW YORK

DRIVE GEAR FOR LOCOMOTIVES

Application filed December 15, 1926. Serial No. 154,951.

My invention relates to drive gear for locomotives and particularly to the construction and arrangement of driving wheels and power means for operating them.

The engines commonly employed for the propulsion of locomotives operate more efficiently and economically when a certain momentum of the locomotive has been attained than is the case while the locomotive is being brought to such a speed from a state of rest. Certain types of engines, for example, steam turbines and internal combustion engines, are especially advantageous for the operation of locomotives, since they may be so constructed as to be relatively small in compass and of light weight. Engines of these types develop high power and are highly efficient and economical in operation, but these results are obtainable only when the engines are operating at or above a certain predetermined number of revolutions per minute.

Hence, where the prime mover is directly connected to the driving wheels of the locomotive, considerable difficulty may be had in starting the locomotive, and the operation of the locomotive may be uneconomical at low speeds. My invention is designed and adapted for use in connection with any type or construction of prime mover for locomotives, but, as indicated above, is particularly applicable to and advantageous in the operation of a locomotive driven by an engine such as a steam turbine or internal combustion motor.

One of the principal objects of my invention is to provide a locomotive with drive mechanism of such character and arrangement as will enable the operation of the locomotive to be effected with a maximum facility and economy at any speed, including starting speed.

A further object of my invention is the provision of means for operating a locomotive with facility and economy at high speeds and associated means for effecting such operation with equal facility and economy at low speeds, including starting speed.

Another object of my invention is the provision of improved mechanism for the propulsion of locomotives by high speed engines by associating therewith auxiliary driving mechanism by means of which the locomotive may be operated in starting and at low speeds, or at speeds at which direct actuation of the driving wheels of the locomotive by the engine would be comparatively difficult or expensive.

A still further object of my invention is the provision of independent drive gear systems, one designed and adapted to be used in starting and at low speeds, and the other at relatively high speeds.

In order to accomplish these beneficial results, I provide a locomotive with two sets of driving wheels, which may be termed main drivers and secondary drivers, the main drivers to be used only at relatively high speeds, and preferably directly connected to the driving engine by mechanical transmission, while the secondary drivers are so mounted that they may be lowered to exert a propelling influence upon the locomotive or raised to operate as idlers. The several sets of driving wheels are suitably mounted upon spring suspension systems so constructed as to permit one or the other or both of the sets of drivers to be in effective driving position.

While the broad concept of my invention is capable of being applied to various types and constructions of locomotives and to various forms and arrangements of driving gear, and while the position and arrangement of my main drivers and secondary drivers relative to each other and to the driving engine may be changed within the purview of my invention, the preferred arrangements I have found to be either (1) adjustably to mount the secondary drivers above the main drivers so that they may act frictionally upon the main drivers, or be raised to operate free of the main drivers, or (2) adjustably to mount both the main drivers and the secondary drivers by spring suspension means controllable by the operator, so that either set of drivers may be lowered into contact with the rails, or raised therefrom at will. This latter embodiment may be varied so that both sets of drivers may be positioned upon the rails at the same time.

Tractive power for both drive systems may be furnished by the same driving engine either by mechanical, hydraulic, compressed air, steam or electric transmission or by combinations of these means.

In the drawings I have illustrated in detail these specific embodiments of my invention, and have further illustrated several advantageous adaptations of each to locomotive driving engines and drive gear of various types and constructions.

In the drawings, in which like numerals refer to similar parts throughout the views, Fig. 1 is a side elevational view of the driving gear of a locomotive constructed according to my invention, the driving gear being shown as it appears when in position for starting the locomotive and for operation at low speed.

Fig. 2 is a view similar to that of Fig. 1, but with the driving gear shown as it appears when in normal running position at relatively high speeds.

Fig. 3 is a cross-sectional view taken on the line 3—3 of Fig. 1.

Fig. 4 is a cross-sectional view taken on the line 4—4 of Fig. 2.

Fig. 5 is a plan view of the running gear of the locomotive, a portion thereof being shown in section.

Fig. 6 is a cross-sectional view taken on the line 6—6 of Fig. 5 and showing the running gear of the locomotive in starting position, as in Fig. 1.

Fig. 7 is a view similar to Fig. 6, but showing the running gear as it appears when the locomotive is running at normal speeds, as in Fig. 2.

Fig. 8 is an end view of the locomotive running gear as it appears when the locomotive is moving at normal speeds, with the parts positioned as shown in Fig. 2.

Figs. 9 and 10 are side elevational views showing, in starting and normal running positions, respectively, a modified adaptation of the form of driving gear illustrated in Figs. 1 to 8, inclusive.

Figs. 11 and 12 are side elevational views showing, in starting and normal running positions, respectively, another modified adaptation of the form of driving gear illustrated in Figs. 1 to 8, inclusive.

Fig. 13 is a cross-sectional view of the form of my invention in which either the main drivers or secondary drivers may be lowered to contact with the track rails and shows the running gear of a locomotive of this modified type with the driving elements in position for starting the locomotive.

Fig. 14 is a view similar to Fig. 13 but showing the locomotive motor and also showing the driving elements in position for operating the locomotive at relatively high speeds.

Fig. 15 is a plan view of the driving gear used in the Figs. 13 and 14 form of the invention.

Fig. 16 is an end view of the structure shown in Fig. 14.

Figs. 21 and 22 are side elevational views showing, in starting and normal running positions, respectively, a third modification of the driving gear shown in Fig. 14.

Figs. 23 and 24 are side elevational views showing, in starting and normal running positions, respectively, a fourth modification of the drive shown in Fig. 14, and Figs. 25 and 26 are side elevational views showing, in starting and normal running positions, respectively, a form of drive of the Fig. 14 type which is particularly adapted for use with a turbine-driven locomotive.

Figure 17:
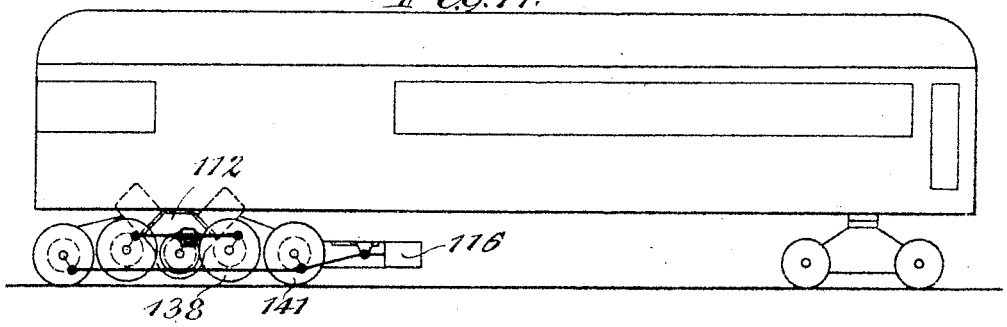
Figs. 17 and 18 are side elevations showing, in starting and normal running positions, respectively, a modified form of the driving gear shown in Fig. 14.

In the form of drive gear shown in Figs. 1 to 12, inclusive, the main drivers or driving wheels 1 and 2 of the locomotive A rest upon the track rails, while the secondary driving wheels 6 and 7 are mounted directly above wheels 1 and 2, respectively, and are so mounted that they may be lowered to act frictionally upon the main drivers or raised to operate free of the main drivers. The drivers 1 and 2 are carried upon axles 4 supported in journal-boxes 3 and 5. Secondary driving wheels 6 and 7 are similarly carried on axles 8 and 10 supported in journal-boxes 9 and 11.

A motor 12, preferably of the internal combustion type, and provided with cylinders 37, is mounted preferably between the secondary driving axles and this motor rotates a main engine shaft 13 carrying a flywheel. The motor 12 has a direct driving connection through connecting rods 14 with the secondary driving wheels 6 and 7 and an indirect driving connection through connecting rod 38 and suitable mechanical or fluid-operated devices, to the main driving wheels 1 and 2. In the preferred construction of this form of my invention connecting rod 38 is pivotally attached to a cross-head 39 attached to a piston 40 working in an air or other fluid-type compressor 15. The compressor 15 is connected to a motor cylinder 16 by suitable piping, not shown, and thus drives a piston 41, cross-head 17 and connecting rods 18 to operate the main driving wheels 1 and 2.

The method of driving the locomotive shown in Figs. 1 to 8, inclusive, is as follows: When the locomotive is at rest and is to be started, the secondary drivers 6 and 7 will be raised from contact with the main drivers 1 and 2 by a mechanism hereinafter described. The secondary drivers will then be in the position shown in Fig. 1. Operation of the motor 12 will cause the secondary drivers 6 and 7 to idle and will operate the compressor 15 through the connections 38 and 39. The compressed fluid may then be caused to act upon the piston 41 in cylinder 16 with the result that the main drivers 1 and 2 will be turned and the locomotive will be caused to move. When the locomotive attains a speed which will enable it to be more efficiently operated by direct drive from engine 12, the secondary drivers 6 and 7 will be lowered to bear upon the main drivers 1 and 2, as shown in Figs. 2 and 4, and the motor 12 will then act directly upon the main drivers through the frictional engagment of the secondary drivers therewith. At this time the valve mechanism of the cylinders 15 and 16 will be operated to store the air compressed by cylinder 15 in a suitable reservoir (not shown). It will be obvious that the speed of the locomotive may now be varied merely by changing the speed of the engine 12. When the locomotive is being indirectly driven, as in Figs. 1 and 3, the engine is enabled to run at higher speed than would be possible were it connected by direct transmission with driving wheels 1 and 2. The air thus compressed may be controlled and the speed of the locomotive regulated by operation of suitable valve mechanism, similar to the ordinary steam engine control mechanism, with which the cylinders 15 and 16 are equipped.

In accordance with my invention disclosed in Figs. 1 to 8, inclusive, and as heretofore stated, it is desirable that the weight of that portion of the locomotive which is above the lower or main driving wheels 1 and 2 may normally be transmitted to these drivers through the main axles 4 and that this weight may also be shifted to rest upon the main drivers at the points of contact of the secondary drivers 6 and 7 therewith. The mechanism employed for this purpose with the system of drive shown in Figs. 1 to 4, inclusive, is illustrated in Figs. 5 to 8, inclusive. In these latter views the main driver axles 4 are shown supported in a stationary underframe 42. The secondary driving axle journal-boxes 9 and 11 are supported to be vertically slidable in slideways 43 in the frame 42, upward movement of the journal-boxes being limited by shoulders 35. Shafts 19, 20 and 21 are journaled in the sides of the frame 42, shaft 19 being at one end of the frame, shaft 20 between the drivers, and shaft 21 at the opposite end of the frame. Each of the shaft 19, 20 and 21 is provided with a pair of eccentrics 22 and an intermediately arranged eccentric 44 at each end thereof, the eccentric 22 being offset 180° relative to the eccentric 44.

Straps or bands 45, positioned to bear against the eccentrics 44, are connected to what may be termed a "lower spring suspension", generically indicated by the numeral 46 and comprising springs 24 and 25 bearing upon the main driver axles 4 and an equalizer 30, all joined by links 48. Bands 23, positioned upon the eccentrics 22, are connected to a secondary or upper spring suspension indicated by the numeral 47ᵃ and comprising two upper springs 28 and 29, intermediate springs 26 and 27, directly beneath upper springs 28 and 29, respectively, and an equalizer 47. Links 49 connect the outer ends of the springs 26 and 28 and of springs 27 and 29 with their respective straps 23 and also join the inner ends of the pairs of springs to the ends of the equalizers 47. The intermediate springs 26 and 27 are beneath the secondary driving axles 8 and 10 and therefore directly bear the weight of these axles, while the springs 28 and 29 are above the axles 8 and 10 and directly support the locomotive body, i. e., substantially all of the weight of the locomotive except that portion shown in Figs. 1 to 8, inclusive.

The shafts 19, 20 and 21 are provided with gears 31 midway of their length and these are engaged by racks 32 upon a longitudinally slidable rod 33 actuated by a fluid operated piston 50 moving in a cylinder 34 (Fig. 5) or by any other suitable operating means. Operation of rod 33 serves to rotate the shafts 19, 20 and 21 and change the position of the eccentrics 22 and 44.

The operation of the above mechanism for shifting the weight of the locomotive and changing the position of the secondary drivers is as follows: When the locomotive drive is to be placed in starting position, as in Fig. 6, and the secondary drivers are to be raised from contact with the main drivers, the shafts 19, 20 and 21 are rotated by the racks 32 to move the eccentrics 22 to uppermost position and eccentrics 44 to lowermost position. This movement of eccentrics 22 raises the springs of the upper suspension 47ᵃ and the intermediate springs 26 and 27 thus forcing the axles 8 and 10 and secondary drivers 6 and 7 upwardly and away from the main drivers, the upper springs 28 and 29, being at the same time released of their load. At the same time, the movement of the eccentrics 44 to lowermost position moves the lower springs 24 and 25 downwardly to bear upon the main driving axles 4. It will be seen that when the parts are thus positioned the locomotive body and the secondary drivers are supported upon the main drivers wholly through the springs 24 and 25 bearing upon the axles 4. This is the position shown in Fig. 6 and corresponds to the starting position of the driving mechanism shown in Figs. 1 and 3.

When the locomotive has attained the necessary speed to make direct driving (as shown in Fig. 2) desirable, the eccentrics 22 and 44 are moved 180°. Eccentrics 44 of the lower suspension are then in their upper positions and eccentrics 22 of the upper suspension are in their lower position. This movement of eccentrics 44 raises the lower springs 24 and 25 from the main driving axles 4, while the movement of eccentrics 22 lowers the intermediate springs 26 and 27, and relieves them of the weight of the secondary drivers 6 and 7 which are caused to bear upon the main drivers 1 and 2. The downward movement of the upper springs 28 and 29 causes them to bear upon the secondary axles 8 and 10. The result will be that, as shown in Figs. 7 and 8, substantially the entire spring-suspended weight of the locomotive will rest upon the secondary drivers 6 and 7 forcing them into frictional contact with the main drivers 1 and 2. The driving mechanism is now in the position shown in Figs. 2 and 4 and is adapted for direct drive of the main drivers. This position is preferably maintained while the locomotive is running at relatively high speeds. When the speed is reduced below a certain minimum, the secondary drivers will again be raised by the rack and pinion mechanism above described and the main drivers operated by the indirect driving connection through connecting rod 38.

The driving mechanism shown in Figs. 9 and 10 is generally similar to that of Figs. 1 to 8, inclusive, the principal differences being in the use of two motors 12, with their cylinders 37, and a greater number of secondary and main drivers. This particular adaptation of my invention includes a main drive shaft 13 at each end of the set of secondary drivers 6, the shafts 13 and drivers 6 being connected by driving rods 14 to act synchronously. A compressor 15, also operated by the motors 12, and suitably connected to fluid motor 16 in a manner similar to that heretofore described, is adapted to drive the locomotive when the driving gear is in starting position, as shown in Fig. 9. A number of main drivers equal to the number of secondary drivers is provided and these are operatively connected to one another by rods 18 and to the fluid motor 16 by a crosshead 60 and rod 61. The drive thus described operates in normal running position (shown in Fig. 10) in a manner exactly similar to that of the mechanism of Figs. 1 to 8.

The form of my invention shown in Figs. 11 and 12 is the same as that described above except that two pairs of secondary drivers 6 are provided, with a jackshaft 36 between the pairs. The drive shaft 13 is connected to the jackshaft 36 by a connecting rod 62. The remainder of the construction of this form is similar to the two forms already described; its manner of operation is substantially the same as that of the Figs. 1 to 8 and Figs. 9 and 10 forms.

In the form of my invention shown in Figures 13 to 26, inclusive, both the main drivers and the secondary drivers are adjustably mounted so that either set of drivers may be lowered into contact with the track rails or raised free therefrom. The main driving wheels or drivers 138 are carried upon axles 139 mounted in journal-boxes 140 which are vertically slidable in slideways 161 in the locomotive underframe 162. In the specific embodiment of the invention shown in Figs. 13 and 14 the secondary drivers 141 are alternated with the main drivers 138. The locomotive may be fitted with the usual wheel-trucks 144.

Referring more particularly to Figs. 13 to 16, inclusive, the secondary drivers 141 are shown fixed upon axles 142 mounted in journal-boxes 143 which are vertically slidable in slideways 163 in the underframe 162. An engine or motor of any suitable type and construction may be employed, such, for example, as a Diesel motor having cylinders 137 with pistons of the opposed type (Fig. 14). Motor 112 is provided with crank-shafts 113 connected by connecting rods 163 with jackshafts 157. The jackshafts 157 (Fig. 15) are operatively connected to the main drivers 138 by driving cranks 164 of the usual 90° type. When the locomotive is being driven at relatively high speeds the motive power will be transmitted to the main drivers 138 through the elements just described.

In starting the locomotive and running at relatively low speeds, the motive power is applied in a different manner, to drive a set or sets of secondary drivers 141 indirectly through a fluid compressor or other power storage means actuated by the motor. For this purpose, the fluid compressor, of the type shown in Figs. 1 and 2, is connected to motor 112 by suitable driving connections and is also connected to a fluid motor 116 to drive the latter to furnish power for use with the secondary or starting and slow speed drivers. Motor 116 is connected to one of the secondary drivers 141 by a crosshead 166 and rod 167 and this driver is in turn operatively connected to the other secondary drivers 141 by connecting arms 169 which rotate the secondary axles 142 by means of crankarms 168 thereon (Fig. 15).

The manner in which power is furnished for the secondary or starting and low speed drive will be apparent from the foregoing description. It will also be understood that either the main drivers 138 or the secondary drivers 141 may be moved to contact with the track rails and that the former are designed to be used while the locomotive is moving at high speed and the latter when it is started and moving at low speed.

The arrangement of the running gear used with the form of my invention shown in Figs. 13 to 26, inclusive, whereby either set of drivers may be positioned to contact with the rails is illustrated in detail in Figs. 13 to 16, inclusive. Shafts 170 journaled in each side of the locomotive underframe 162 are provided with eccentrics 171 at each end which are connected by eccentric straps 173, to a main suspension system generically designated by the numeral 172. This suspension system comprises springs 151 carrying the main driver journal boxes 140 by means of hangers 174. The outer ends of the springs 151 are connected to the outer eccentric straps 173 by links 175 and the inner ends of the springs of adjacent elements of the system are joined to an equalizer 149 by other links 175. The equalizer 149 is also supported on an eccentric 171.

A second series of shafts 146 journaled in the underframe 162 is provided for similar suspension means for the secondary drivers. These shafts 146 are so spaced relative to shafts 170 as to support a secondary suspension system generically designated by the numeral 176. Shafts 146 are provided with eccentrics 147 arranged at an angle of 180° relative to the eccentrics 171. Eccentric straps 177 fitted on the eccentrics 147 carry hangers 178 for the secondary driver springs 154 and attached journal boxes 143 of the secondary drivers. An equalizer 148 is also provided in the secondary suspension system 176. The operation of the eccentrics 171 and 147 may be effected by any suitable mechanism under the control of the operator. In the specific embodiment of the invention illustrated rack and pinion operating means are employed, the same being constructed and arranged in the same general manner as the rack and pinion means illustrated as the preferred form of operating means in Figs. 1 to 8, inclusive. This mechanism shown in Figs. 13 to 16, inclusive, comprises shafts 170 and 146, provided with gears 158 intermediate their ends adapted to mesh with racks 159 on a reciprocable rod 180 extending longitudinally of the underframe 162. A power cylinder 160 preferably positioned at one end of the frame 162 is operatively connected to rod 180 to move the latter in either direction, and thus through racks 159 and pinions 158, to turn shafts 170 and 146 to vary the position of the eccentrics 171 and 147. The power cylinder may be actuated in any desired manner but will preferably be connected to the air compressor of the locomotive and will be driven by that force.

By means of the suspension described above, the point of suspension of the weight of the locomotive may be changed so that either the main drivers 138 will contact with the track rail and bear the weight or the secondary drivers 141 will be lowered to bear the weight. When the locomotive is to be started the rod 180 is shifted to move the eccentrics 171 of the main suspension system 172 to uppermost position and the secondary suspension eccentrics 147 to lowermost position. This action will move the main driver journal boxes 140 upwardly in the slideways 161 of the underframe 162 while the secondary journal boxes 143 will be moved downwardly in their slideways 163 and the secondary drivers will thereby assume the weight of the locomotive. The driving gear will now be in the position shown in Fig. 13 and the locomotive may be started under stored power furnished by fluid motor 116.

When the locomotive has attained the required speed for direct drive from the driving motor 112, the rod 180 may be shifted to reverse the position of the eccentrics 171 and 147 so that the main drivers 138 will be placed upon the track and secondary drivers 141 will be raised.

An additional eccentric mechanism 181 may also be connected to be operated by the rod 180 so that the wheel trucks 144 may be moved relative to the track. This eccentric mechanism will preferably be so arranged as to permit the wheels 144 to bear less of the locomotive weight when the secondary drivers 141 are in contact with the track, so that these drivers will have greater tractive force.

Figure 18:
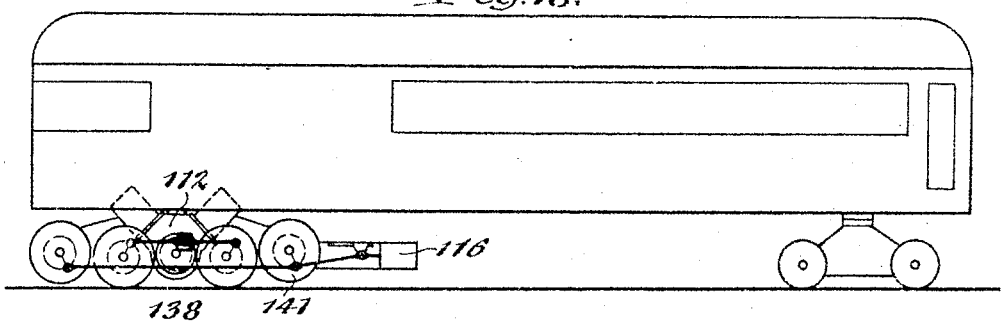

Figs. 17 and 18 show a drive more particularly designed for a motor rail car. An engine 112 of V-type is provided. The construction of the driving gear is similar to that of the Figs. 13 to 16 disclosure, except that a pair of main drivers 138 is interposed between a pair of secondary drivers 141. The entire operation of this drive is exactly similar to that of the Figs. 13 to 16 form and should require no further description.

Figure 19:
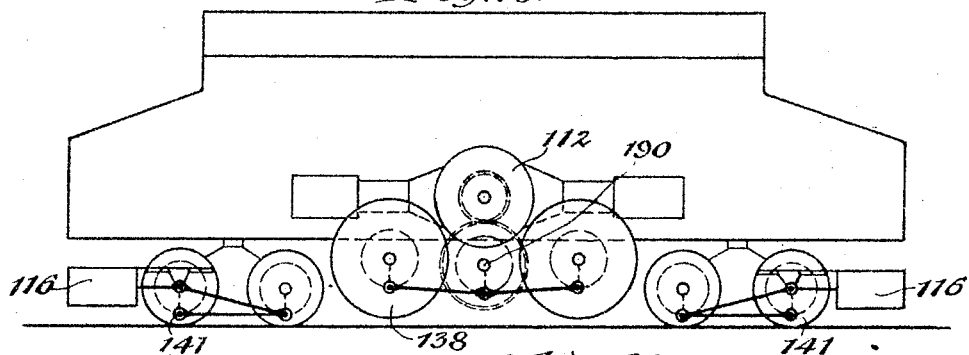
Figs. 19 and 20 are side elevational views showing, in starting and normal running positions, respectively, a further modification of the drive of Fig. 14.
Figure 20:
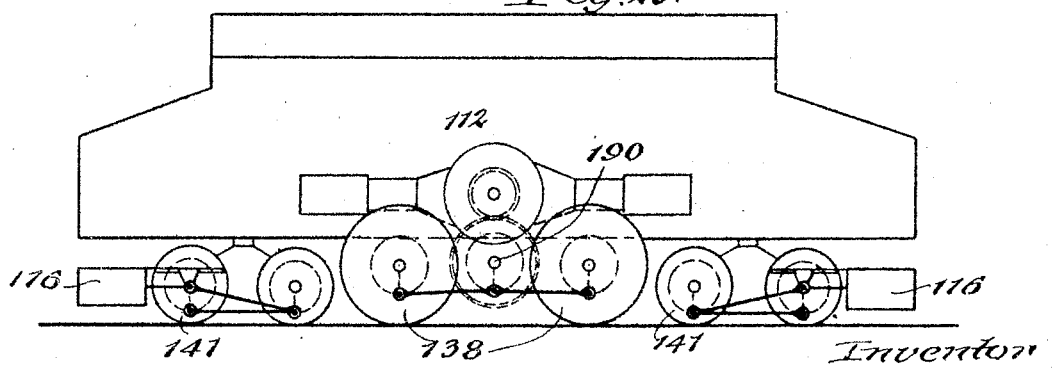

Figs. 19 and 20 show a drive of the Figs. 13 to 16 type particularly designed for a freight locomotive. In this particular form of the invention the secondary drivers 141 remain upon the rails at all times, but bear sufficient traction weight only when the locomotive is being driven by them as in Fig. 19. When the main drivers 138 are positioned on the rails (Fig. 20), they will bear the locomotive weight and the secondary drivers 141 will merely idle. During the idling period of the secondary drivers, the valve mechanism of the air compressor (not shown) and fluid motor 116 may be shifted so that the compressor will store compressed fluid in a reservoir for later use. The motor 112 in the adaptation illustrated in Figs. 19 and 20 is connected to the main drivers 138 through a jackshaft 190. The remainder of the construction and operation of this form is similar to that of the Figs. 13 to 16 structure.

Figs. 21 and 22 show a construction similar to that of Figs. 19 and 20 except that it is accommodated to a larger locomotive provided with two motors 112 and two jackshafts 190. Fig. 21 shows the secondary (or indirect) drive position and Fig. 22 the main (or direct) drive position.

Figs. 23 and 24 show a locomotive which is similar in construction and operation to the Figs. 13 and 16 type but provided with two motors 112 connected to main drivers 138 by link mechanism 191. A plurality of pressure motors 160 are also provided for the secondary drivers 141 spaced along the underframe. Fig. 23 shows the secondary drive in operation while Fig. 24 shows the main drive in use. It will be noted that wheel-trucks 144 are arranged to be lifted from the rails when the secondary drivers are in position.

Figs. 25 and 26 show a steam turbine locomotive provided with a turbine 192 with gearing connections 193 to the main drivers 138. In this form of the invention, as in the form shown in Figs. 23 and 24, wheel trucks 144 are adapted to be lifted from the rails when the secondary drivers 141 are in use (Fig. 26) and to be placed on the rails when the main drive is in operation (Fig. 25).

It will be understood that any of the types of drive described above may be used in connection with articulated locomotives, and may be applied to locomotives having driving engines or motors of various types, the engines specifically mentioned herein not being intended to represent the full extent of the applicability or adaptability of my invention.

I claim:

1. In a locomotive, an engine, independent drive gear systems, one of said systems being directly connected to and operated by said engine, the other of said systems being indirectly operated by said engine, means for throwing one of said systems into and out of operative driving condition and means for shifting the tractive weight of the locomotive in accordance with the system which is being used.

2. In a locomotive, an engine, main drive wheels connected thereto, secondary drive wheels, spring suspension means for said secondary drive wheels comprising springs, hangers connected to said springs, cams for raising and lowering said hangers, a shaft carrying said cams, rack and pinion means for rotating said shaft, power means controllable by the operator for actuating said rack and pinion means, and an air compressor actuated by said engine for operating said secondary drive wheels.

3. In a locomotive, an engine, a set of main drive wheels connected thereto, a set of secondary drive wheels, spring suspension means for each set of secondary drive wheels comprising springs, links connecting said springs, eccentrics engaging said links for raising and lowering said springs and the wheels suspended therefrom, shafts carrying said eccentrics, pinions on said shafts, a rack meshing with the pinions of the suspension means for all of the wheel sets, power means for operating said rack, equalizing means connecting the spring suspension links of separate sets of wheels, and power storage means actuated by said engine for operating said secondary drive wheels.

4. In a locomotive, an engine, main drive wheels connected to said engine, spring suspension means for said main drive wheels, secondary drive wheels, spring suspension means for said secondary drive wheels, and adjusting means for each of said spring suspension means for moving some of said drive wheels into operative driving position and simultaneously moving others of said drive wheels out of operative driving position.

5. In a locomotive, an engine, a set of main drive wheels connected to said engine, a set of secondary drive wheels, means for operating said secondary drive wheels, spring suspension means for each set of wheels, each comprising springs, links connecting said springs, cams for raising and lowering said links, equalizing means connecting the spring suspension means of the sets of main drive wheels, equalizing means connecting the spring suspension means for the secondary drive wheels, shafts carrying said cams, pinions on said shafts, a rack member meshing with said pinions, and means for operating said rack member, said cams being arranged to simultaneously move said main drive wheels and said secondary drive wheels vertically in opposite directions.

6. In a locomotive, an engine, a set of main drive wheels connected to said engine, a set of secondary drive wheels, means for operating said secondary drive wheels, suspension means for each set of wheels, equalizing means connecting the suspension means of the main drive wheels, equalizing means connecting the suspension means of the secondary drive wheels, and means for vertically moving the suspension means of both sets of wheels in opposite directions simultaneously, whereby one set of wheels is moved to and the other from operative driving position.

7. In a locomotive, an engine, main drive wheels connected to said engine, secondary drive wheels on each side of said main drive wheels, power storage means for operating said secondary drive wheels, and means for moving said secondary drive wheels and said main drive wheels vertically in opposite directions to place one set of wheels into and the other set out of driving position.

8. In a locomotive, a driving engine in the middle portion thereof, main drive wheels adjacent said engine and connected thereto for direct drive therefrom, a set of secondary drive wheels near each end of the locomotive, auxiliary power means for driving each set of secondary drive wheels by indirect drive from said engine, and means for moving said main drive wheels vertically to place them into and out of operative driving position.

9. In a locomotive, a driving engine in the middle portion thereof, main drive wheels adjacent said engine and connected thereto for direct drive therefrom, a set of secondary drive wheels near each end of the locomotive, a set of secondary drive wheels between said main drive wheels, auxiliary power means for driving each set of secondary drive wheels by indirect drive from said engine, and means for moving said main drive wheels vertically out of operative driving position.

10. In a locomotive, two driving systems, means for rendering one or the other of said systems operative, two spring suspension systems, one for each driving system, and means for shifting the tractive weight of the locomotive with reference to said spring suspension systems and in accordance with the driving system which is being used.

In testimony whereof I affix my signature.

KRISTIAN RASMUSSEN.